US009172641B2

(12) United States Patent
Liu et al.

(10) Patent No.: US 9,172,641 B2
(45) Date of Patent: Oct. 27, 2015

(54) SERVER INTERCONNECTION SYSTEM, SERVER, AND DATA FORWARDING METHOD (71) Applicant: NEC (China) Co., Ltd., Beijing (CN)

(72) Inventors: Yongqiang Liu, Beijing (CN); Yan Hu, Beijing (CN); Zhangfeng Hu, Beijing (CN)

(73) Assignee: NEC (CHINA) CO., LTD., Beijing (CN)

( * ) Notice: Subject to any disclaimer, the term of this patent is extended or adjusted under 35 U.S.C. 154(b) by 197 days.

(21) Appl. No.: 13/712,270

(22) Filed: Dec. 12, 2012

(65) Prior Publication Data
US 2013/0230048 A1 Sep. 5, 2013

(30) Foreign Application Priority Data

Mar. 2, 2012 (CN) .......................... 2012 1 0053521

(51) Int. Cl.
H04L 12/28 (2006.01)
G06F 15/16 (2006.01)
H04L 12/741 (2013.01)
H04L 29/06 (2006.01)
H04L 29/12 (2006.01)

(52) U.S. Cl.
CPC ............ *H04L 45/745* (2013.01); *H04L 61/103* (2013.01); *H04L 29/06* (2013.01); *H04L 29/12018* (2013.01); *H04L 29/12028* (2013.01)

(58) Field of Classification Search
CPC ................................................. H04L 45/745
USPC ......... 370/219, 231, 238, 256, 338, 392, 401, 370/409, 419; 455/560, 561; 707/2
See application file for complete search history.

(56) References Cited

U.S. PATENT DOCUMENTS

| 2002/0080755 A1* | 6/2002 | Tasman et al. ................ 370/338 |
| 2004/0006688 A1* | 1/2004 | Pike et al. ........................ 713/1 |
| 2005/0080923 A1* | 4/2005 | Elzur ............................. 709/238 |
| 2006/0003807 A1* | 1/2006 | Inoue et al. ................... 455/561 |
| 2006/0013224 A1* | 1/2006 | Chiba ............................ 370/389 |
| 2007/0214105 A1* | 9/2007 | Sfarti et al. ....................... 707/2 |
| 2008/0151893 A1* | 6/2008 | Nordmark et al. ........... 370/392 |
| 2008/0275975 A1* | 11/2008 | Pandey et al. ................ 709/223 |
| 2008/0285448 A1* | 11/2008 | Abdulla et al. .............. 370/231 |
| 2008/0310311 A1* | 12/2008 | Flammer et al. ............. 370/238 |
| 2010/0097926 A1* | 4/2010 | Huang et al. ................. 370/219 |
| 2011/0026403 A1* | 2/2011 | Shao et al. ................... 370/235 |
| 2012/0287939 A1* | 11/2012 | Leu et al. ..................... 370/409 |
| 2012/0294192 A1* | 11/2012 | Masood et al. .............. 370/255 |
| 2013/0051400 A1* | 2/2013 | Fomin et al. ................. 370/402 |

* cited by examiner

*Primary Examiner* — Alpus H Hsu
*Assistant Examiner* — Camquyen Thai
(74) *Attorney, Agent, or Firm* — Tutunjian & Bitetto, P.C.

(57) ABSTRACT

A server interconnection system includes three switches each having n downlink ports and an uplink port, wherein n is an integer equal to or larger than 2; and m servers each having at least two network interface cards respectively connected to downlink ports of different switches, wherein m=3p/2, p is an even number equal to or larger than 2 but equal to or less than n, wherein every three servers form a group. A first server connects to a downlink port of a first switch and a downlink port of a second switch via two network interface cards. A second server connects to a downlink port of the first switch and a downlink port of a third switch via two network interface cards. A third server connects to a downlink port of the second switch and a downlink port of the third switch via two network interface cards.

18 Claims, 10 Drawing Sheets

Rack 1 (48 Servers)  Rack 2 (48 Servers)  Rack 3 (48 Servers)

Fig. 7B

Rack 1 (72 Servers)  Rack 2 (72 Servers)

SERVER INTERCONNECTION SYSTEM, SERVER, AND DATA FORWARDING METHOD

TECHNICAL FIELD

The present disclosure relates to data center networks, particularly to a server interconnection system, a server, and a data forwarding method, which can allow more servers to become neighbors, so as to localize more traffic flows in the data center networks. In the present disclosure, the term "neighbor" refers to any two servers, which can perform communication without over uplink of an edge switch (or Top of Rack (ToR)).

BACKGROUND

In the current cloud computation, servers that provide cloud services with computation and storage capabilities are all arranged in the data center and are connected via networks. Therefore, the role of the today's data center is becoming increasingly important.

Figure 1:
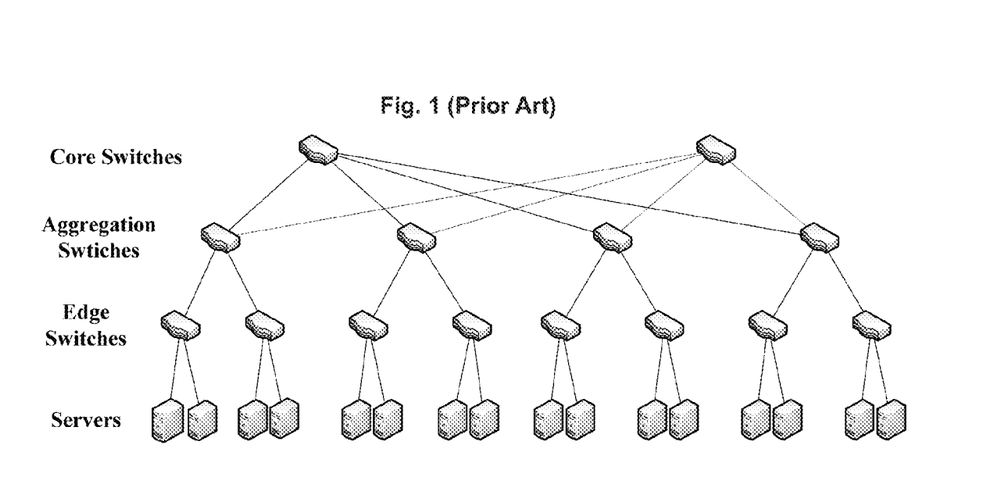
FIG. 1 is a schematic diagram for illustrating a structure of a typical data center network.

FIG. 1 is a schematic diagram for illustrating a structure of a typical data center network. In a tree network structure as shown in FIG. 1, an edge switch (or ToR) usually has forty-eight 1G Ethernet ports downwardly connected to servers and one to four 10G Ethernet ports upwardly connected to aggregation switches. A link between an edge switch and an aggregation switch is referred to as uplink. Thus, when there are a large number of data communications occurring for servers between Racks, the core network will often become a bottleneck, which results in degradation of applications' performances. Especially in today's cloud computation environments, a growing number of applications like Map-Reduce require transferring large amounts of data between the servers. One simple optimization method is to localize as many servers' communications as possible, i.e., data transmission does not need to go through the core network. Imagine if a rack is capable of accommodating a sufficient number of servers, so that a large distributed system can be completely deployed over these services and thus communications between these servers do not need to go through the congested core network, then the core network will not become the bottleneck of the system. In reality, however, the number of connectable servers in one rack is limited to the number of ports of an edge switch (usually 48). It is of very high cost to extend the number of ports of the edge switch, for example, the price of a 96-port switch is about ten times that of a 48-port switch.

Figure 2:
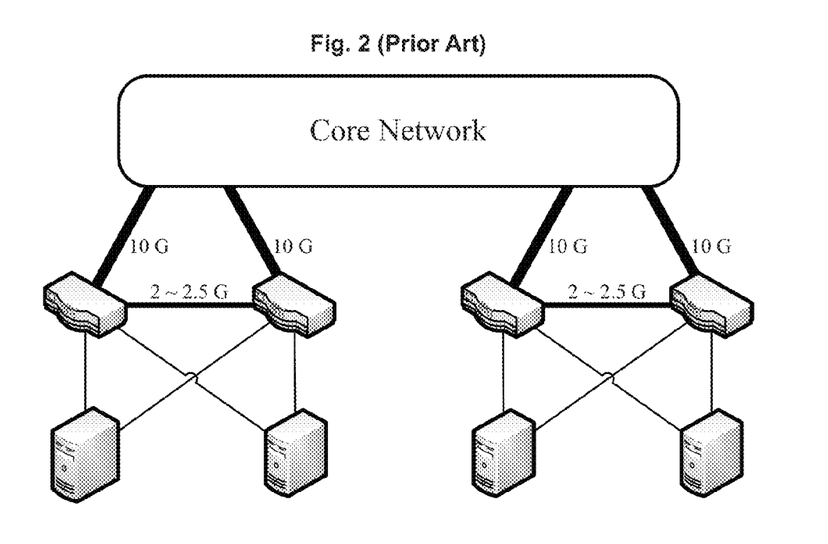
FIG. 2 is a schematic diagram for illustrating a combination of an edge switch stack solution and a server end link aggregation solution.

FIG. 2 is a schematic diagram for illustrating a combination of an edge switch stack solution and a server end link aggregation solution. The benefit of such a connection is to increase bandwidth of servers, and communications of servers under each edge switch and is not limited to stacked data lines. According to the edge switch stack solution, the edge switch may be equipped with extra stack modules, and may be connected with each other via data lines (data lines "2 to 2.5G" as shown in FIG. 2). In accordance with the server end link aggregation (Link Aggregation, or Network Interface Card (NIC) Bonding) solution, a plurality of NICs are inserted into one server (host), and software providing a link aggregation function may allow a plurality of NICs to share one network identifier (e.g., a MAC address, an IP address, and the like). However, even if the edge switch stack solution is combined with the server end link aggregation solution, the number of servers capable of direct communication does not increase. For example, assume each switch has 48 ports, then the number of servers that are connected in such a combination is still (48+48)/2=48, because each server needs to occupy two ports of the switch.

SUMMARY

The present disclosure provides a server interconnection system, a server, and a data forwarding method, which may allow more servers to become neighbors. The server may not only receive and transmit its own data but also forward data for its neighbors, thereby localizing more traffic flows in the data center networks.

According to a first aspect of the present disclosure, a server interconnection system is provided. The server interconnection system includes: three switches each having n downlink ports and at least one uplink port, where n is an integer equal to or larger than 2; and m servers each having at least two network interface cards respectively connected to downlink ports of different switches, where m=3p/2, p is an even number equal to or larger than 2 but equal to or less than n. Every three servers form a group. A first server in a server group is connected to a downlink port of a first switch and a downlink port of a second switch via its two network interface cards respectively. A second server in the server group is connected to a downlink port of the first switch and a downlink port of a third switch via its two network interface cards respectively. A third server in the server group is connected to a downlink port of the second switch and a downlink port of the third switch via its two network interface cards respectively.

The server interconnection system according to the first aspect of the present disclosure may be further improved to be an improved server interconnection system. In one embodiment, three server interconnection systems according to the first aspect of the present disclosure may be employed. Each server has at least four network interface cards in which two network interface cards are still connected to downlink ports of different switches in its server interconnection system and the other two network interface cards are respectively connected to corresponding newly-added network interface cards of corresponding servers in the other two server interconnection systems. A first server in a server group of a first server interconnection system is connected to a corresponding newly-added network interface card of a first server in a server group of a second server interconnection system and a corresponding newly-added network interface card of a first server in a server group of a third server interconnection system via its two newly-added network interface cards respectively. A second server in the server group of the first server interconnection system is connected to a corresponding newly-added network interface card of a second server in the server group of the second server interconnection system and a corresponding newly-added network interface card of a second server in the server group of the third server interconnection system via its two newly-added network interface cards respectively. A third server in the server group of the first server interconnection system is connected to a corresponding newly-added network interface card of a third server in the server group of the second server interconnection system and a corresponding newly-added network interface card of a third server in the server group of the third server interconnection system via its two newly-added network interface cards, respectively. The first server in the server group of the second server interconnection system is connected to a corresponding newly-added network interface card of the first server in the server group of the first server interconnection system and a corresponding newly-added network interface card of the first server in the server group of the third server interconnection system via its two newly-added network interface cards respectively. The second server in the server group of the second server interconnection system is connected to a corresponding newly-added network interface card of the second server in the server group of the first server interconnection system and a corresponding newly-added network interface card of the second server in the server group of the third server interconnection system via its two newly-added network interface cards respectively. The third server in the server group of the second server interconnection system is connected to a corresponding newly-added network interface card of the third server in the server group of the first server interconnection system and a corresponding newly-added network interface card of the third server in the server group of the third server interconnection system via its two newly-added network interface cards, respectively. The first server in the server group of the third server interconnection system is connected to a corresponding newly-added network interface card of the first server in the server group of the first server interconnection system and a corresponding newly-added network interface card of the first server in the server group of the second server interconnection system via its two newly-added network interface cards, respectively. The second server in the server group of the third server interconnection system is connected to a corresponding newly-added network interface card of the second server in the server group of the first server interconnection system and a corresponding newly-added network interface card of the third server in the server group of the third server interconnection system via its two newly-added network interface cards respectively. The third server in the server group of the third server interconnection system is connected to a corresponding newly-added network interface card of the third server in the server group of the first server interconnection system and a corresponding newly-added network interface card of the third server in the server group of the second server interconnection system via its two newly-added network interface cards, respectively.

According to a second aspect of the present disclosure, a server deployed in the server interconnection system according to the first aspect of the preset disclosure is provided. The server includes a destination MAC lookup unit configured to obtain a data packet from a network protocol stack and determine a destination MAC address of the data packet with an ARP mapping table; a forwarding table lookup unit configured to look up a forwarding table based on the destination MAC address to determine a cached network interface card to send the data packet; a neighbor lookup unit configured to look up a neighbor information table based on the destination MAC address to determine a cached network interface card to send the data packet; and a data packet transmitter configured to send the data packet to the network interface card determined by the forwarding table lookup unit or the neighbor lookup unit, and thereby sending the data packet via the network interface card. When the forwarding table lookup unit does not find a record corresponding to the destination MAC address in the forwarding table, the forwarding table lookup unit sends the destination MAC address to the neighbor lookup unit to look up the neighbor information table. When the neighbor lookup unit finds a record corresponding to the destination MAC address in the neighbor information table, the neighbor lookup unit informs a network interface card in the record to the forwarding table lookup unit as the network interface card to send the data packet, and the forwarding table lookup unit updates the forwarding table to add a new record.

According to a third aspect of the present disclosure, a server deployed in the server interconnection system according to the first aspect of the present disclosure is provided. The server includes a data packet receiver configured to receive a data packet from a network interface card; a data packet classifier configured to determine whether a destination MAC address of the data packet is a MAC address of the server or not, and send the destination MAC address to a neighbor lookup unit when the destination MAC address is not the MAC address of the server; a neighbor lookup unit configured to look up a neighbor information table based on the destination MAC address to determine a cached network interface card to send the data packet; and a data packet transmitter configured to send the data packet to the network interface card determined by the neighbor lookup unit, and thereby sending the data packet via the network interface card.

According to a fourth aspect of the present disclosure, a data forwarding method used in the server interconnection system according to the first aspect of the present disclosure is provided. The data forwarding method includes: obtaining a data packet from a network protocol stack, and determining a destination MAC address of the data packet with an ARP mapping table; looking up a forwarding table based on the destination MAC address to determine a cached network interface card to send the data packet; if a record corresponding to the destination MAC address is not found in the forwarding table, looking up a neighbor information table based on the destination MAC address to determine a cached network interface card to send the data packet; and if a record corresponding to the destination MAC address is found in the neighbor information table, sending the data packet via the determined network interface card.

According to a fifth aspect of the present disclosure, a data forwarding method used in the server interconnection system according to the first aspect of the present disclosure is provided. The data forwarding method includes: receiving a data packet from a network interface card, and determining whether a destination MAC address of the data packet is a MAC address of the server or not; if the destination MAC address is not the MAC address of the server, looking up a neighbor information table based on the destination MAC address to determine a cached network interface card to send the data packet; and if a record corresponding to the destination MAC address is found in the neighbor information table, sending the data packet via the determined network interface card.

According to the present disclosure, more servers may become neighbors. A server may not only receive and transmit its own data but also forward data for its neighbors, so that communications between more servers may not have to go through uplink of the edge switches any more, thereby localizing more traffic flows in the data center networks.

BRIEF DESCRIPTION OF THE DRAWINGS

The above and other objects, features, and advantages of the present disclosure will be clear through the following description of embodiments of the present disclosure, in conjunction with drawings in which.

Throughout the drawings, the same or similar elements or steps are identified by the same or similar reference signs.

DETAILED DESCRIPTION OF EMBODIMENTS

In the following, embodiments of the present disclosure will be detailed in conjunction with the drawings, and the principles and implementations of the present disclosure will become apparent to those skilled in the art. However, the present disclosure is not limited to the particular embodiments as described below. Moreover, common elements related to the present disclosure are not described for the sake of clarity and simplicity.

Figure 3:
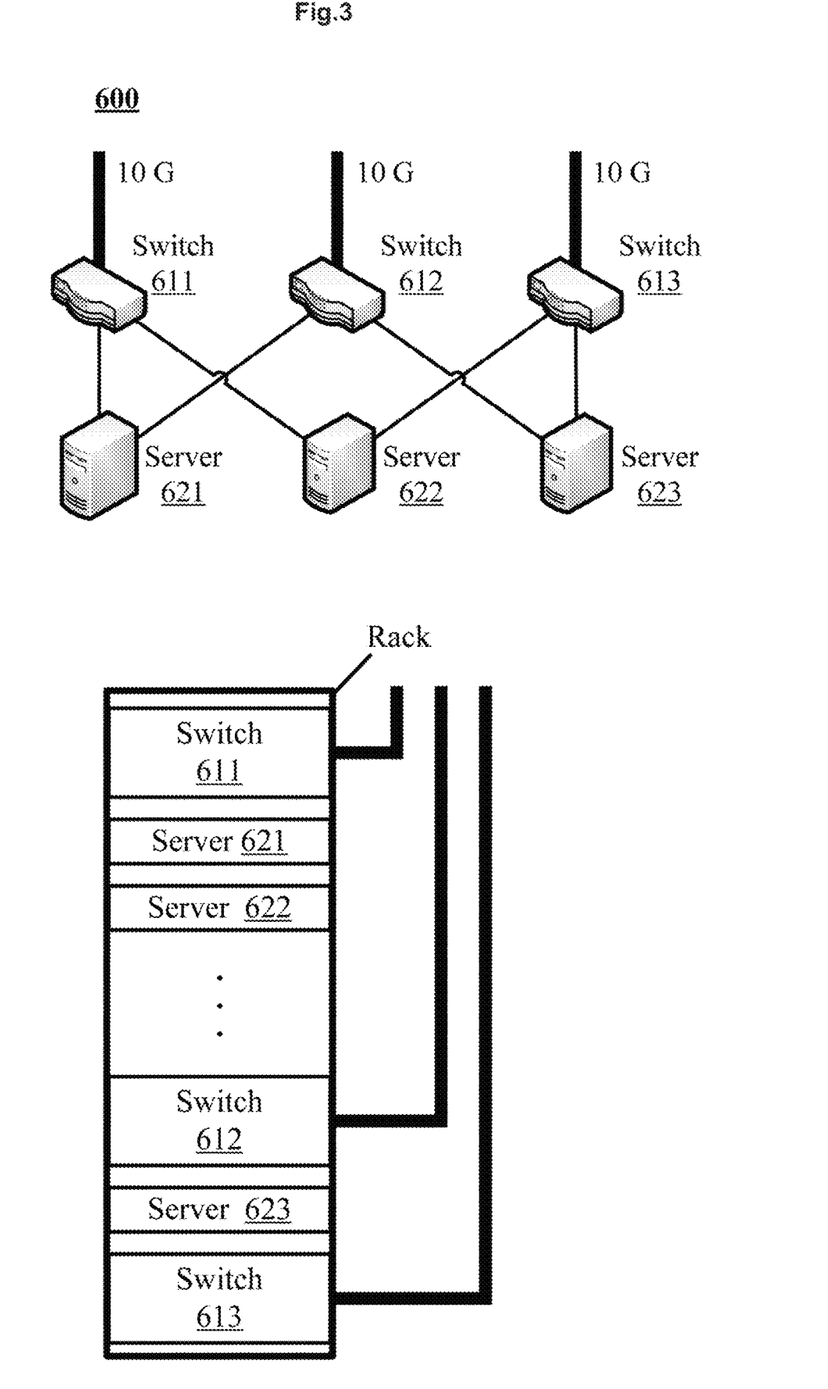
FIG. 3 is a schematic diagram of architecture of a server interconnection system 600 according to the present disclosure.

FIG. 3 is a schematic diagram for illustrating a server interconnection system 600 according to the present disclosure.

As shown in FIG. 3, the server interconnection system 600 according to the present disclosure includes three switches 611, 612 and 613, and three servers 621, 622 and 623. Each of the switches 611, 612 and 613 has at least two downlink ports (e.g., a 1G Ethernet port) and at least one uplink port (e.g., a 10G Ethernet port). Each of the servers 621, 622 and 623 has at least two network interface cards respectively connected to downlink ports of different switches. Specifically, the server 621 is connected to downlink ports of the switches 611 and 612 via two network interface cards respectively; the server 622 is connected to downlink ports of the switches 611 and 613 via two network interface cards respectively; and the server 623 is connected to downlink ports of the switches 612 and 613 via two network interface cards respectively.

The switches and the servers are connected following the architecture as shown in FIG. 3. For a switch having 48 downlink ports, there are 72 (48*3/2=72) servers that can be connected by the architecture of FIG. 3.

Moreover, as shown in FIG. 3, the three switches 611, 612 and 613 and the three servers 621, 622 and 623 may be arranged within a single rack.

Figure 4:
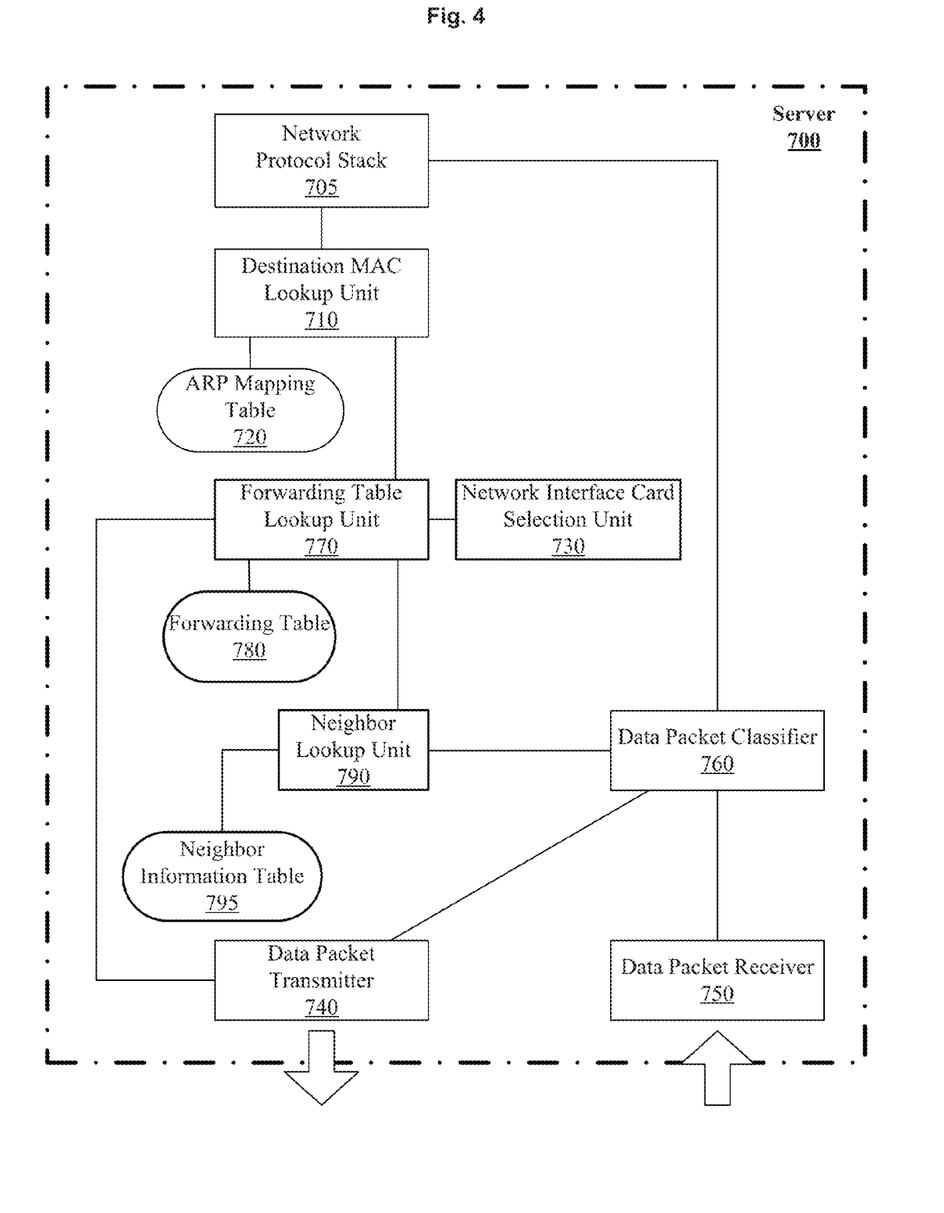
FIG. 4 illustrates in detail a structure of each server 700 in the architecture as shown in FIG. 3.

FIG. 4 illustrates in detail a structure of each server 700 (e.g., the servers 621, 622 and 623 in FIG. 3) in the architecture as shown in FIG. 3.

As shown in FIG. 4, each server 700 includes a network protocol stack 705, a destination Media Access Control (MAC) lookup unit 710, an Address Resolution Protocol (ARP) mapping table 720, a forwarding table lookup unit 770, a forwarding table 780, a neighbor lookup unit 790, a neighbor information table 795, a network interface card selection unit 730, a data packet transmitter 740, a data packet receiver 750 and a data packet classifier 760.

In the following, specific operations of each unit in the server 700 as shown in FIG. 4 will be described in detail.

The destination MAC lookup unit 710 obtains a data packet from the network protocol stack 705 of the server 700 and then looks up a destination MAC address of the data packet in the ARP mapping table 720. If the destination MAC address is not found, an ARP query message is broadcasted. When an ARP Reply message is obtained, records in the ARP mapping table 720 are updated.

The ARP mapping table 720 records mapping of an IP address to a MAC address, e.g., 123.127.186.211→AA:BB:CC:DD:EE:FF.

The forwarding table lookup unit 770 looks up the forwarding table 780 based on the destination MAC address to determine a cached network interface card to send the data packet. If a corresponding record is found, the data packet transmitter 740 is called to send the data packet via the determined network interface card. Meanwhile, a timeout value of the record is reset as a default value (e.g., 10 seconds). If there is no corresponding record found, the neighbor lookup unit 790 is called. If the neighbor lookup unit 790 returns a designated network interface card, the forwarding table 780 is updated, and the data packet transmitter 740 is called to send the data packet via the returned network interface card. If the neighbor lookup unit 790 returns NULL, the network interface card selection unit 730 is called to select a network interface card to send the data packet, and the forwarding table 780 is updated and the data packet transmitter 740 is called to send the data packet via the selected network interface card.

The forwarding table 780, for example having a data structure as shown in FIG. 1, caches the determined/returned/selected network interface card to send the data packet. If there is a record matched, a timeout value of the record will be reset as a default value. If timeout occurs for some record, the record will be deleted automatically.

Table 1 shows an exemplary data structure of the forwarding table 780 of FIG. 4.

TABLE 1

| Forwarding Table 780 | | |
|---|---|---|
| MAC Address | Number of NIC | Timeout (Second) |
| AA:BB:CC:DD:EE:FF | Eth0 | 10 |
| ... | ... | ... |

The neighbor lookup unit 790 looks up the neighbor information table 795 based on the destination MAC address. If there is a corresponding record found, this means that the destination address of the data packet is a neighbor of the server 700 and then a network interface card corresponding to the neighbor may be returned. Otherwise, NULL is returned.

The neighbor information table 795, for example having a data structure as shown in FIG. 2, caches neighboring information of the server 700. The neighboring information may include, but is not limited to, an IP address, a MAC address, a connected network interface card, a timeout value, and the like of a neighbor server. The present disclosure is not limited to a construction process of the neighboring table 795, which may be constructed by using any method. As an example, the server 700 may run a Daemon instance. The instance monitors a specific port (e.g., 5566) and periodically broadcasts an Announcement Message via all network interface cards. The message contains identification information of the port (IP address and MAC address). The server 700 updates its own neighboring information table 795 when receiving an Announcement Message from a neighbor. In order to avoid errors caused by an Announcement Message broadcasted via other racks entering a local rack, the following filtering conditions may be set at edge switches such as the switches 611, 612 and 613 as shown in FIG. 3:

| | |
|---|---|
| if | in_port = uplink port (10G), dst port = 6668, protocol = udp |
| then | drop the packet |

Table 2 shows an exemplary data structure of the neighbor information table 795 of FIG. 4.

TABLE 2

| Neighboring Information Table 795 | | | |
|---|---|---|---|
| IP Address | MAC Address | Number of NIC | Timeout (Second) |
| 192.168.1.2 | AA:BB:CC:DD:EE:FF | Eth0 | 10 |
| ... | ... | ... | ... |

The network interface card selection unit 730 selects a network interface card to send the data packet based on an eXclusive OR (XOR) operation. Specifically, the network interface card may be determined based on the following XOR operation:
  network interface card index=(source MAC address XOR destination MAC address) modulo (the number of the network interface cards).

The data packet transmitter 740 is configured to send the data packet to the network interface card determined by the forwarding table lookup unit 770, thereby further sending the data packet via the network interface card.

The data packet receiver 750 is configured to receive the data packet from the network interface card.

The data packet classifier 760 is configured to compare the destination MAC address of the data packet with a MAC address of a host. If the destination MAC address is the MAC address of the local server 700, the data packet is uploaded to the network protocol stack 705 of the server 700. If the destination MAC address is not the MAC address of the local server 700, the data packet classifier 760 further needs to additionally call the neighbor lookup unit 790 to determine whether the destination MAC address is a MAC address of a neighbor of the local server 700. If the neighbor lookup unit 790 returns a designated network interface card, the data packet transmitter 740 is called to forward the data packet via the returned network interface card. If the neighbor lookup unit 790 returns NULL, the data packet is dropped.

Figure 5:
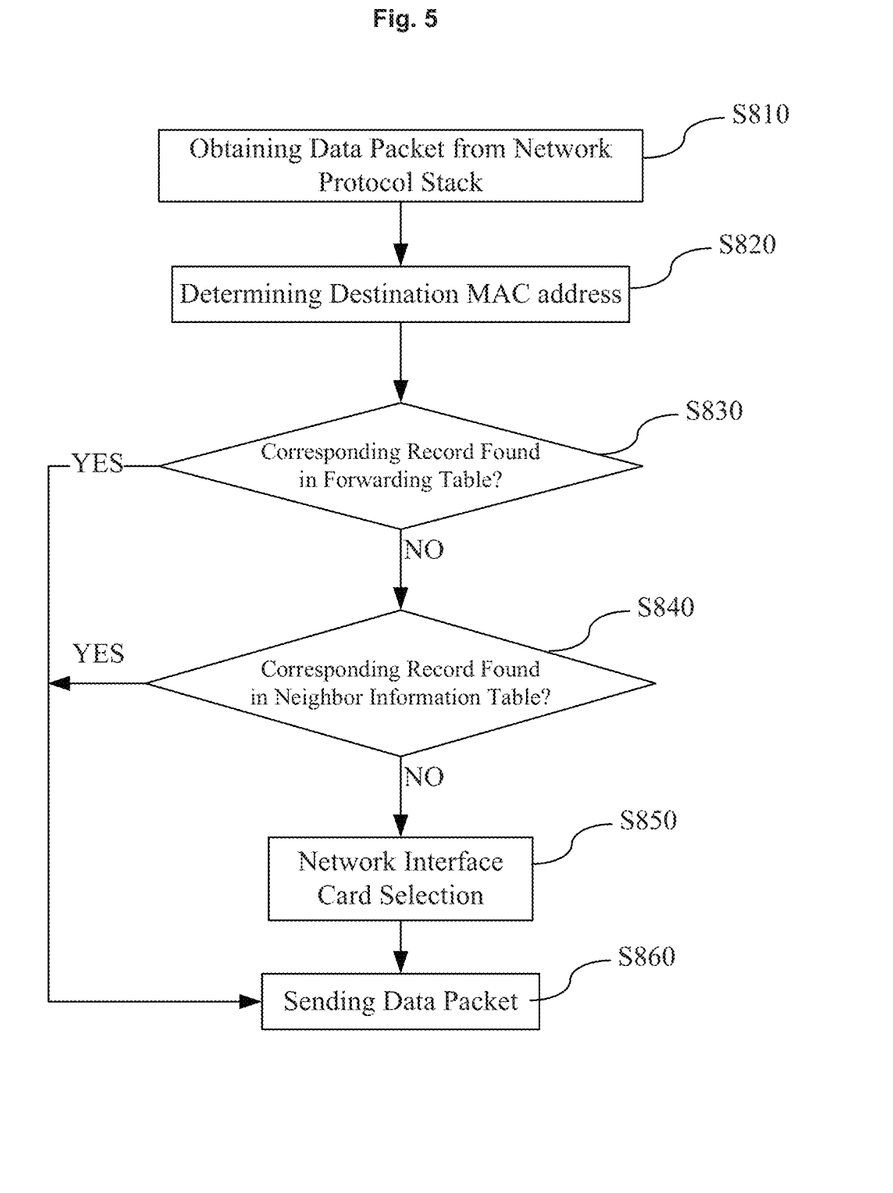
FIG. 5 illustrates a flowchart of a data forwarding method 800 according to the present disclosure.
Figure 6:
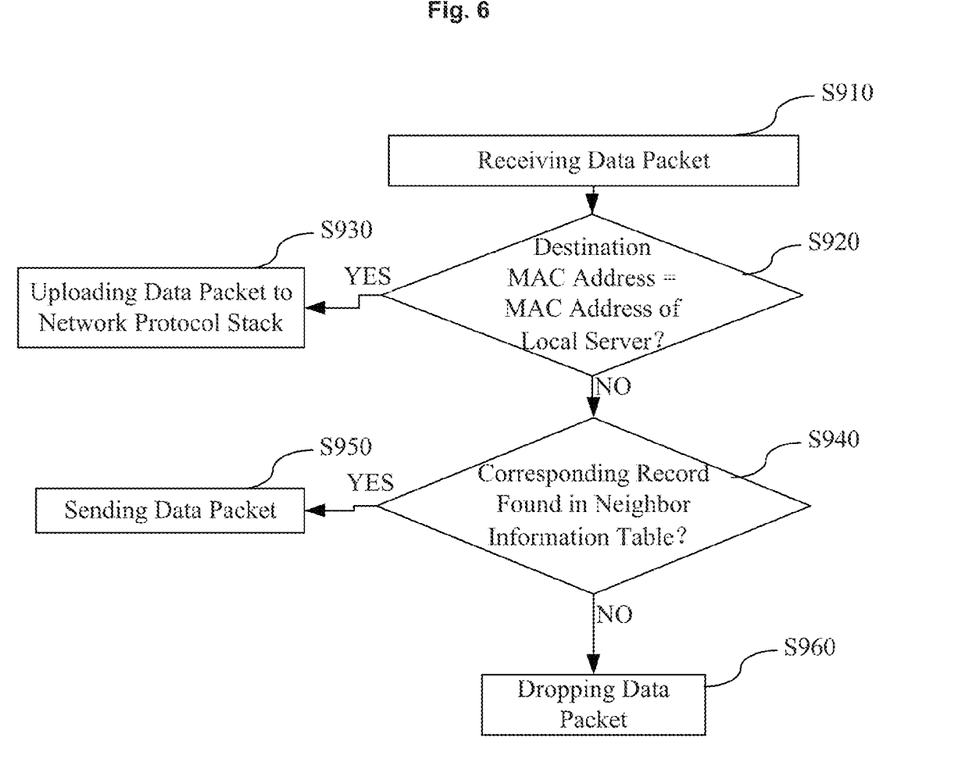
FIG. 6 illustrates a flowchart of a data forwarding method 900 according to the present disclosure.

FIGS. 5 and 6 are flowcharts of data forwarding methods 800 and 900 according to the present disclosure respectively.

As shown in FIG. 5, a data packet is obtained from a network protocol stack at step S810. At step S820, a destination MAC address of the data packet is determined by using an ARP mapping table. At step S830, a forwarding table is looked up based on the destination MAC address, and a cached network interface card to send the data packet is determined. If a corresponding record is found (step S830: YES), the method proceeds to step S860 of sending the data packet via the determined network interface card. If there is no corresponding record found (step S830: NO), the method proceeds to step S840 of looking up a neighboring information table based on the destination MAC address to determine a cached network interface card to send the data packet. If a corresponding record is found (step S840: YES), the method proceeds to step S860 of sending the data packet via the determined network interface card. If there is no corresponding record found (step S840: NO), the method proceeds to step S850 of selecting a network interface card to send the data packet based on an eXclusive OR (XOR) operation (for example, network interface card index=(source MAC address XOR destination MAC address) modulo (the number of the network interface cards)). After that, the data packet is sent via the selected network interface card at step S860.

As shown in FIG. 6, a data packet is obtained from a network interface card at step S910. At step S920, it is determined whether a destination MAC address of the data packet is a MAC address of a local server. If the destination MAC address is the MAC address of the local server (step S920: YES), the method proceeds to step S930 of uploading the data packet to a network protocol stack. If the destination MAC address is not the MAC address of the local server (step S920: NO), the method proceeds to step S940 of looking up a neighbor information table based on the destination MAC address to determine a cached network interface card to send the data packet. If there is a corresponding record found (step S940: YES), the method proceeds to step S950 of sending the data packet via the determined network interface card. If there is no corresponding record found (step S940: NO), the method proceeds to step S960 for dropping the data packet.

Figure 7A:
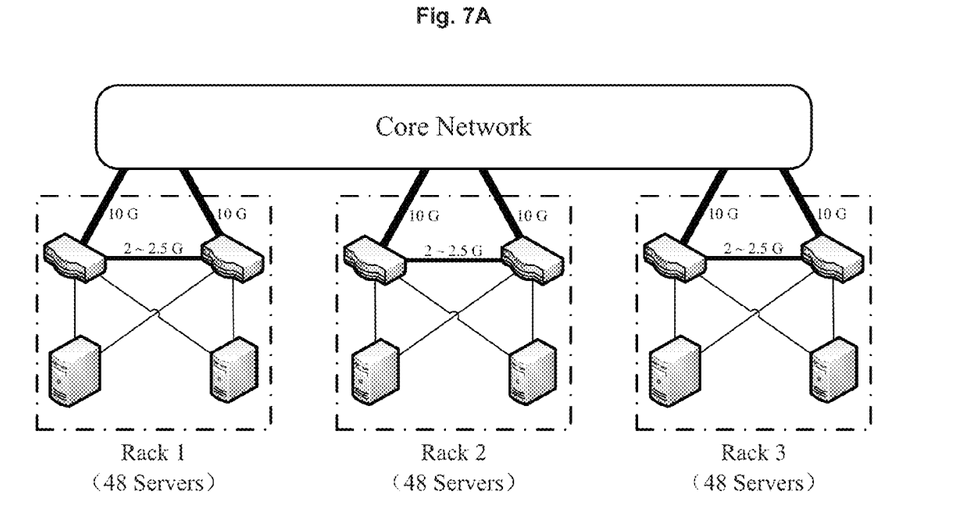
FIG. 7A and FIG. 7B are schematic diagrams for illustrating performance comparisons between the present disclosure and a solution for comparison, respectively.
Figure 7B:
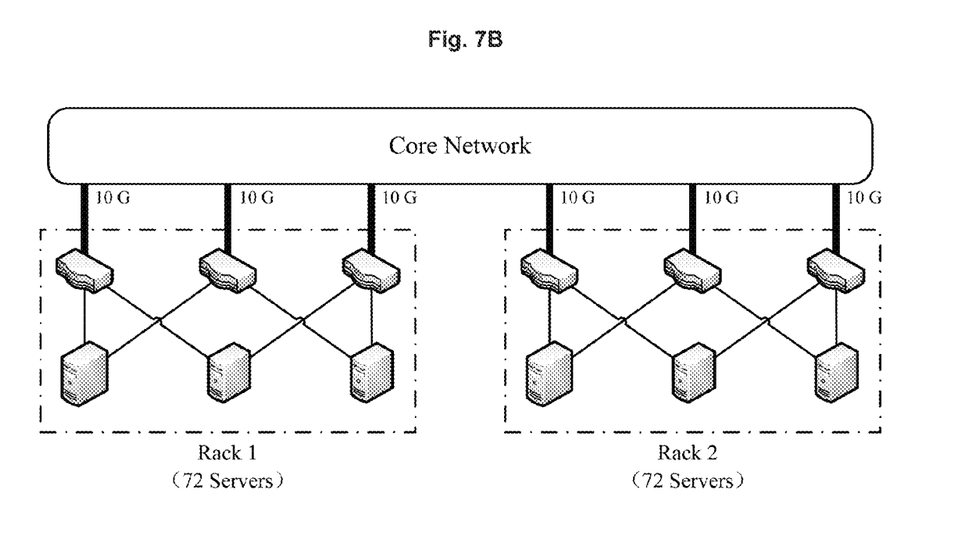

FIGS. 7A and 7B are schematic diagrams for illustrating performance comparisons between the present disclosure and a solution for comparison, respectively. As shown in FIGS. 7A and 7B, there are the same number of edge switches and the same number of servers, respectively (6 switches and 144 servers), but their connection manners are different. Table 3 shows specific comparison data.

TABLE 3

| | Present Disclosure | Solution for Comparison |
|---|---|---|
| Wideband Per Rack | 30 G bps | 20 G bps |
| Wideband Per Server | 2 G bps | 2 G bps |
| Number of Neighbors | 72 | 48 |

It may be seen from Table 3 that the present disclosure may allow more servers to become neighbors, thereby localizing more traffic flows in the data network centers.

Figure 8:
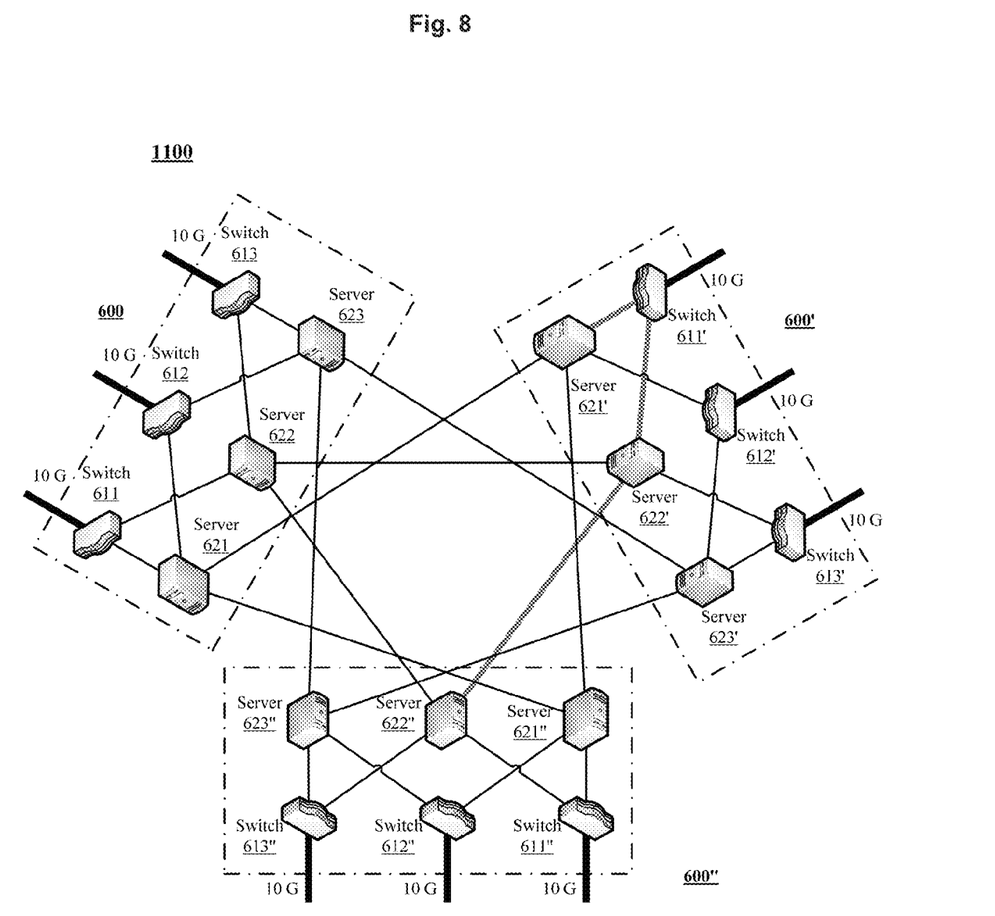
FIG. 8 is a schematic diagram for illustrating architecture of an improved server interconnection system 1100 according to the present disclosure.

FIG. 8 is a schematic diagram for illustrating architecture of an improved server interconnection system 1100 according to the present disclosure.

As shown in FIG. 8, the improved server interconnection system 1100 according to the present disclosure includes three server interconnection systems 600, 600' and 600" as shown in FIG. 3. FIG. 8 differs from FIG. 3 in that each of servers 621, 622, 623, 621', 622', 623', 621", 622" and 623" has four network interface cards, in which two initial network interface cards are still connected to downlink ports of different switches in its local rack, and the other two newly-added network interface cards are respectively connected to corresponding newly-added network interface cards of corresponding servers in the other two racks.

In particular, the server 621 is connected to downlink ports of the switches 611 and 612 via the two initial network interface cards, respectively; the server 622 is connected to downlink ports of the switches 611 and 613 via the two initial network interface cards, respectively; and the server 623 is connected to downlink ports of the switches 612 and 613 via the two initial network interface cards, respectively. The server 621 is connected to corresponding newly-added network interface cards of the servers 621' and 621" via the two newly added network interface cards, respectively; the server 622 is connected to corresponding newly-added network interface cards of the servers 622' and 622" via the two newly added network interface cards, respectively; and the server 623 is connected to corresponding newly-added network interface cards of the servers 623' and 623" via the two newly added network interface cards, respectively.

The server 621' is connected to downlink ports of the switches 611' and 612' via the two initial network interface cards, respectively. The server 622' is connected to downlink ports of the switches 611' and 613' via the two initial network interface cards, respectively. The server 623' is connected to downlink ports of the switches 612' and 613' via the two initial network interface cards, respectively. The server 621' is connected to corresponding newly-added network interface cards of the servers 621 and 621" via the two newly added network interface cards, respectively; the server 622' is connected to corresponding newly-added network interface cards of the servers 622 and 622" via the two newly added network interface cards, respectively; and the server 623' is connected to corresponding newly-added network interface cards of the servers 623 and 623" via the two newly added network interface cards, respectively.

The server 621" is connected to downlink ports of the switches 611" and 612" via the two initial network interface cards, respectively. The server 622" is connected to downlink ports of the switches 611" and 613" via the two initial network interface cards, respectively. The server 623" is connected to downlink ports of the switches 612" and 613" via the two initial network interface cards, respectively. The server 621" is connected to corresponding newly-added network interface cards of the servers 621 and 621' via the two newly added network interface cards, respectively; the server 622" is connected to corresponding newly-added network interface cards of the servers 622 and 622' via the two newly added network interface cards, respectively; and the server 623" is connected to corresponding newly-added network interface cards of the servers 623 and 623' via the two newly added network interface cards, respectively.

Thereby, three racks form a federation.

In the improved server interconnection system 1100, each server may have two neighbors that are directly connected via a network interface card, and the data packet arrives at neighboring racks by means of forwarding of the neighbor without passing through uplinks of edge switches. For example, as illustrated by thick real lines in FIG. 8, the server 622 sends the data packet to the server 621" by means of forwarding of the server 622".

Figure 9:
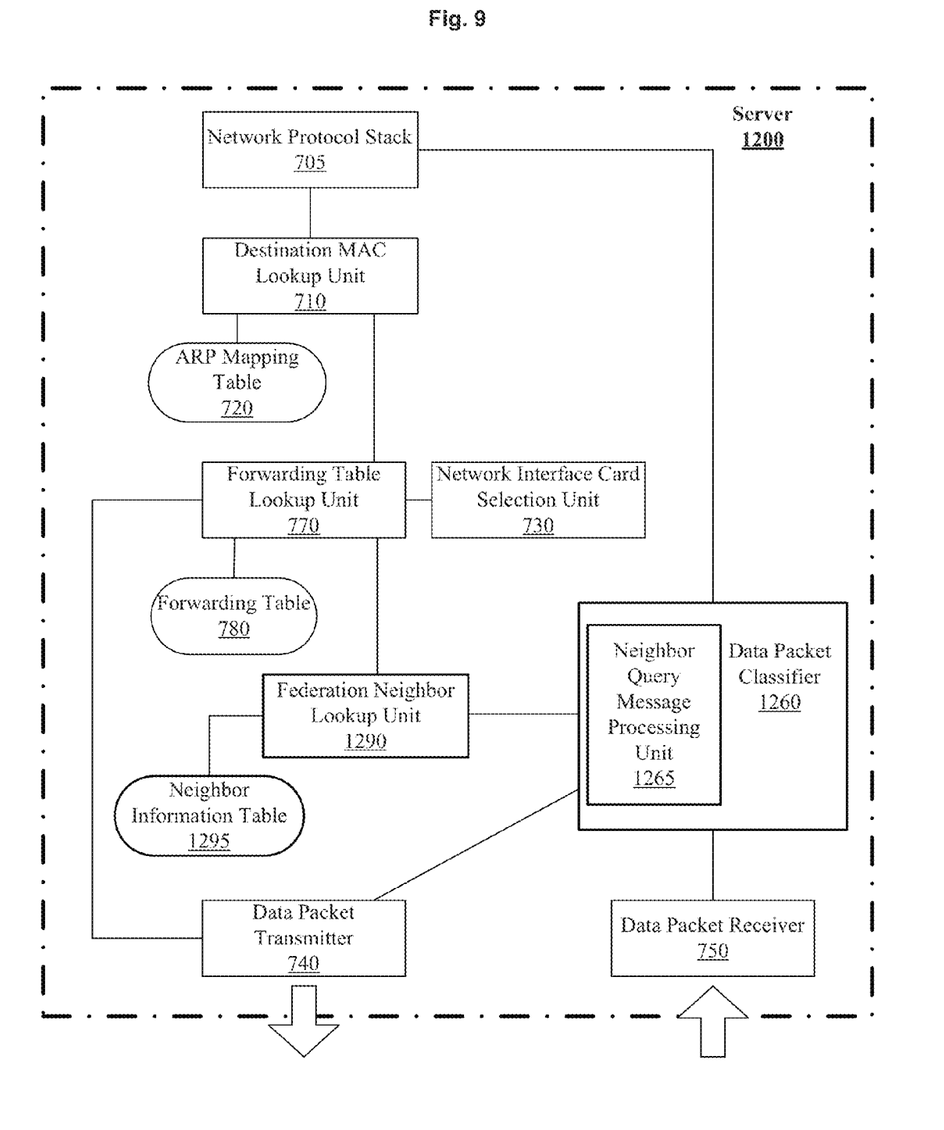
FIG. 9 illustrates in detail a structure of each server 1200 in the architecture as shown in FIG. 8.

FIG. 9 illustrates in detail a structure of each server 1200 (e.g., the servers 621, 622, 623, 621', 622', 623', 621", 622" and 623") in the architecture as shown in FIG. 8. For sake of simplicity, the same components in FIG. 4 are denoted by the same reference signs and detailed description thereof is omitted.

Each server 1200 includes a network protocol stack 705, a destination MAC lookup unit 710, an Address Resolution Protocol (ARP) mapping table 720, a forwarding table lookup unit 770, a forwarding table 780, a federation neighbor lookup unit 1290, a neighbor information table 1295, a network interface card selection unit 730, a data packet transmitter 740, a data packet receiver 750 and a data packet classifier 1260.

The federation neighbor lookup unit 1290 looks up the neighbor information table 1295 based on a destination MAC address. If there is a corresponding record found, this means that the destination address of the data packet is a neighbor (a direct neighbor or an ordinary neighbor) of the server 1200 and then a network interface card corresponding to the neighbor is returned. If there is no corresponding record found, the data packet transmitter 740 sends a neighbor query message (Neighbor_Query) (containing the destination MAC address) to two direct neighbors. After receiving the neighbor query message, the direct neighbors each looks up a record of the destination MAC address in a respective neighbor information table. If there is a corresponding record found, the data packet transmitter returns a neighbor acknowledgement message (Is_My_Neighbor) to the server 1200 that sent the neighbor query message. Otherwise, a not-neighbor acknowledgement message (Not_My_Neighbor) may be sent back. If a direct neighbor returns a neighbor acknowledgement message, the federation neighbor lookup unit 1290 returns a network interface card connected to the direct neighbor. At this time, the forwarding table lookup unit 770 may update the forwarding table 780 based on the network interface card returned by the federation neighbor lookup unit 1290. If there are two direct neighbors each returning a not-neighbor acknowledgement message, the federation neighbor lookup unit 1290 returns NULL to the forwarding table lookup unit 770.

The neighbor information table 1295, for example having a data structure as shown in FIG. 4, caches neighbor information of the server 1200. The neighbor information may include, but is not limited to, an IP address, a MAC address, a connected network interface card, a timeout value, and the like of a neighbor server. As compared with the neighbor information able 795 as shown in Table 2, the neighbor information table 1295 as shown in Table 4 has an identity of a neighbor type (a direct neighbor or an ordinary neighbor) added. In the architecture of the improved server interconnection system 1100 according to the present disclosure as shown in FIG. 8, the neighbor information table 1295 contains two direct neighbor entries.

Table 4 shows an exemplary data structure of the neighbor information table 1295 of FIG. 9.

TABLE 4

Neighbor Information Table 1295

| IP Address | MAC Address | Number of NIC | Timeout (Second) | Type |
|---|---|---|---|---|
| 192.168.1.2 | AA:BB:CC:DD:EE:FF | Eth0 | 10 | Ordinary Neighbor |
| 192.168.1.3 | 11:22:33:44:55:66 | Eth2 | 10 | Direct Neighbor |
| ... | ... | ... | ... | ... |

The data packet classifier 1260 is configured to compare the destination MAC address of the data packet with a MAC address of a host. If the destination MAC address is a MAC address of the local server 1200, the data packet is uploaded to the network protocol stack 705 of the server 1200. If the destination MAC address is not the MAC address of the local server 1200, the data packet classifier 1260 further needs to additionally call the federation neighbor lookup unit 1290 to determine whether the destination MAC address is a MAC address of a neighbor (an ordinary neighbor, or an ordinary neighbor of a direct neighbor) of the local server 1200. If the federation neighbor lookup unit 1290 returns a designated network interface card, the data packet transmitter 740 is called to forward the data packet via the returned network interface card. If the federation neighbor lookup unit 1290 returns NULL, the data packet is dropped. Moreover, the data packet classifier 1260 further includes a neighbor query message (Neighbor_Query) processing unit 1265. After receiving a neighbor query message (containing the destination MAC) from a server serving as a direct neighbor, the neighbor query message processing unit 1265 controls the federation neighbor lookup unit 1290 to query a record of the destination MAC address in its own neighbor information table 1295. If a corresponding record is found, the neighbor query message processing unit 1265 controls the data packet transmitter 740 to return a neighbor acknowledgement message (Is_My_Neighbor) to the server sent the neighbor query message (Neighbor_Query), and otherwise, to return a not-neighbor acknowledgement message (Not_My_Neighbor).

Figure 10:
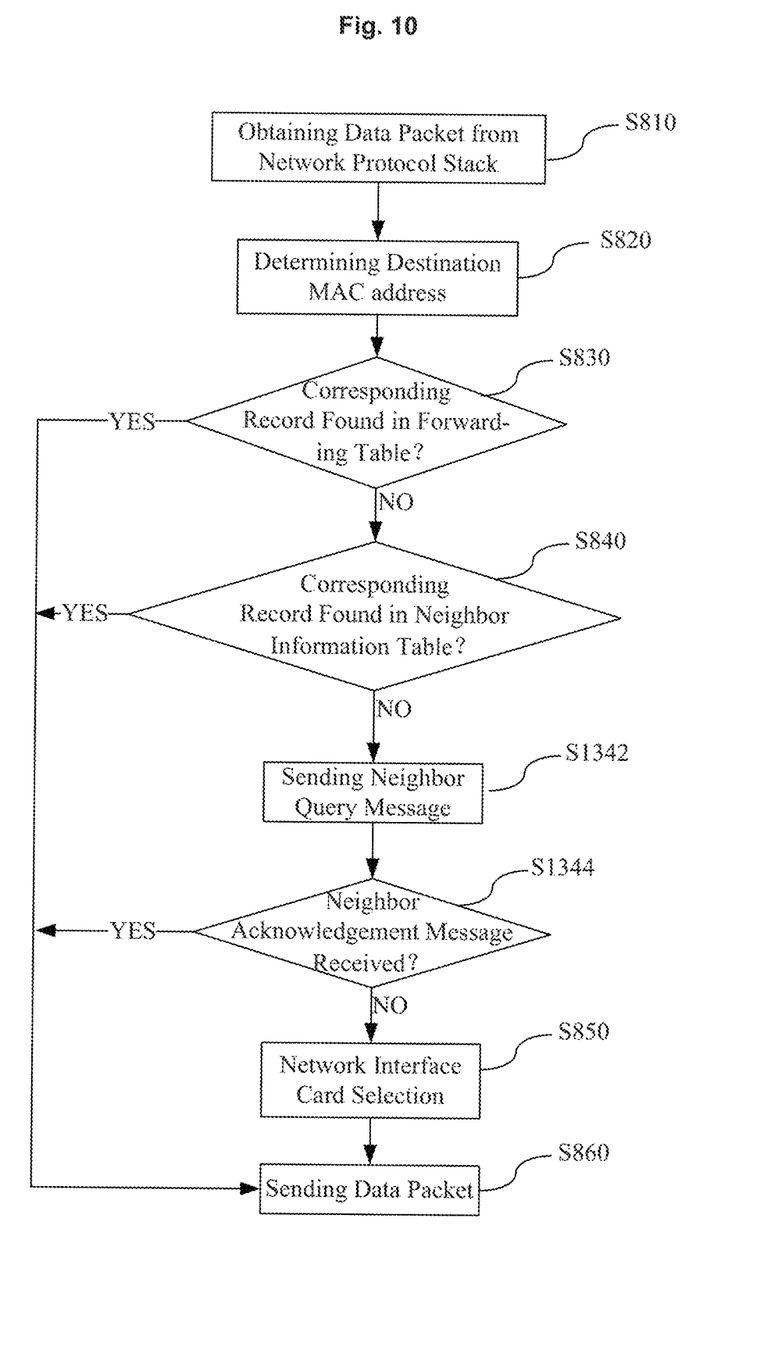
FIG. 10 illustrates a flowchart of a data forwarding method 1300 according to the present disclosure.
Figure 11:
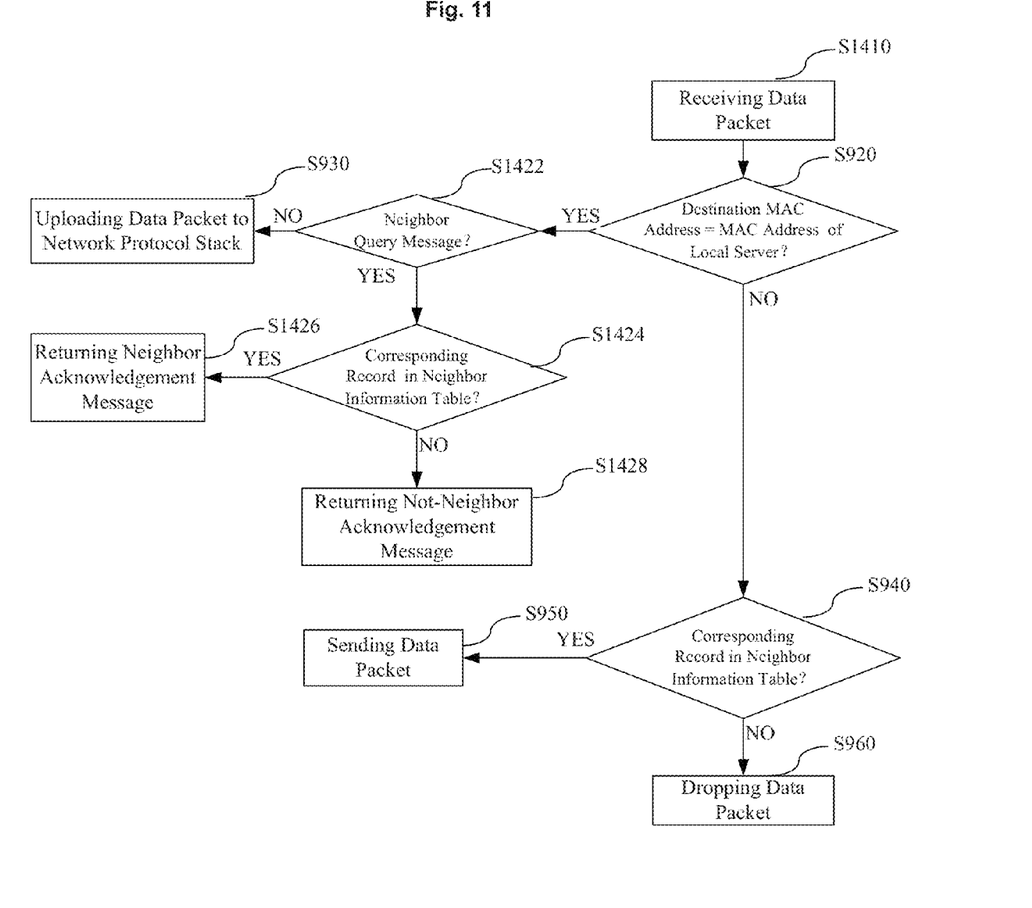
FIG. 11 illustrates a flowchart of a data forwarding method 1400 according to the present disclosure.

FIGS. 10 and 11 are flowcharts of data forwarding methods 1300 and 1400 according to the present disclosure. For sake of simplicity, the same steps with those in FIGS. 5 and 6 are identified by the same reference signs.

As shown in FIG. 10, a data packet is obtained from a network protocol stack at step S810. At step S820, a destination MAC address of the data packet is determined by using an ARP mapping table. At step S830, a forwarding table is looked up based on the destination MAC address, and a cached network interface card to send the data packet is determined. If a corresponding record is found (step S830: YES), the method proceeds to step S860 of sending the data packet via the determined network interface card. If there is no corresponding record found (step S830: NO), the method proceeds to step S840 of looking up a neighboring information table based on the destination MAC address to determine a cached network interface card to send the data packet. If a corresponding record is found (step S840: YES), the method proceeds to step S860 of sending the data packet via the determined network interface card. If there is no corresponding record found (step S840: NO), the method proceeds to step S1342 of sending a neighbor query message (Neighbor_Query) (containing the destination MAC address) to direct neighbors. Then the method proceeds to step S1344 of determining whether a neighbor acknowledgement message (Is_My_Neighbor) is received from a direct neighbor. If the neighbor acknowledgement message is received (step S1344: YES), the method turns to step S860 of sending the data packet to the direct neighbor that sent the neighbor acknowledgement message. If there is no neighbor acknowledgement message received (step S1344: NO), the method proceeds to step S850 of selecting a network interface card to send the data packet based on an eXclusive OR (XOR) operation (for example, network interface card index=(source MAC address XOR destination MAC address) modulo (the number of the network interface cards)). After that, the data packet is sent via the selected network interface card at step S860.

As shown in FIG. 11, a data packet is obtained from a network interface card at step S1410. At step S920, it is determined whether a destination MAC address of the data packet is a MAC address of a local server. If the destination MAC address is the MAC address of the local server (step S920: YES), the method proceeds to step S1422 of determining whether the data packet is a neighbor query message (Neighbor_Query) (containing the destination MAC address). If the data packet is the neighbor query message (step S1422: YES), the method proceeds to step S1424 of looking up the neighbor information table based on the destination MAC address contained in the neighbor query message. If a corresponding record is found (step S1424: YES), the method proceeds to step S1426 of returning a neighbor acknowledgement message (Is_My_Neighbor) to the server sent the neighbor query message. If there is no corresponding record found (step S1424: NO), the method proceeds to step S1428 of returning a not-neighbor acknowledgement message (Not_My_Neighbor) to the server sent the neighbor query message. If it is determined at step S1422 that the data packet is not the neighbor query message (step S1422: NO), the method proceeds to step S930 of uploading the data packet to a network protocol stack. If the destination MAC address is not the MAC address of the local server (step S920: NO), the method proceeds to step S940 of looking up a neighbor information table based on the destination MAC address to determine a cached network interface card to send the data packet. If there is a corresponding record found (step S940: YES), the method proceeds to step S950 of sending the data packet via the determined network interface card. If there is no corresponding record found (step S940: NO), the method proceeds to step S960 of dropping the data packet.

Table 5 shows performance comparison data between the improved solution of the present disclosure and a solution for comparison. Specifically, particular comparison data is shown in a case there are the same number of switches and the same number of servers, respectively (9 switches and 432 servers).

TABLE 5

| | Present Disclosure | Solution for Comparison |
| --- | --- | --- |
| Wideband Per Rack | 30 G bps (maximum 90 G bps) | 20 G bps |
| Wideband Per Server | 4 G bps | 2 G bps |
| Number of Neighbors | 216 | 48 |

It may be seen from Table 5 that the present disclosure with the above improvement may allow more servers to become neighbors, thereby localizing more traffic flows in the data network centers.

Other arrangements of the present disclosure include software programs performing the steps and operations of the method embodiments, which are firstly generally described and then explained in detail. More specifically, a computer program product is such an embodiment, which comprises a computer-readable medium with a computer program logic encoded thereon. The computer program logic provides corresponding operations to provide the above-described 3D positioning solution when it is executed on a computer device. The computer program logic enables at least one processor of a computing system to perform the operations (the methods) of the embodiments of the present disclosure when it is executed on the at least one processor. Such arrangements of the present disclosure are typically provided as: software, codes, and/or other data structures provided or encoded on a computer-readable medium such as optical medium (e.g. CD-ROM), soft disk, or hard disk; or other mediums such as firmware or microcode on one or more ROM or RAM or PROM chips; or an Application Specific Integrated Circuit (ASIC); or downloadable software images and share database, etc., in one or more modules. The software, hardware, or such arrangements can be mounted on computing devices, such that one or more processors in the computing device can perform the technique described by the embodiments of the present disclosure. Software process operating in combination with e.g. a group of data communication devices or computing devices in other entities can also provide the nodes and host of the present disclosure. The nodes and host according to the present disclosure can also be distributed among a plurality of software processes on a plurality of data communication devices, or all software processes running on a group of mini specific computers, or all software processes running on a single computer.

It should be noted that, concisely, the embodiments of the present disclosure can be implemented as software programs, software and hardware on a data processing device, or individual software and/or individual circuit.

The present disclosure has been described in connection with embodiments. It should be understood that those skilled in the art can make various other changes, alternations, and supplementations without departing from the spirit and scope of the present disclosure. Therefore, the scope of the present disclosure is not limited to the above specific embodiments, but is defined by the following claims.

What is claimed is:

1. A server interconnection system, comprising:
three switches each having n downlink ports and at least one uplink port, wherein n is an integer equal to or larger than 2; and
m servers each having at least two network interface cards respectively connected to downlink ports of different switches, wherein m=3p/2, p is an even number equal to or larger than 2 but equal to or less than n, wherein each of said m servers is a server comprising a destination Media Access Control (MAC) lookup unit configured to obtain a data packet from a network protocol stack and determine a destination MAC address of the data packet with an Address Resolution Protocol (ARP) mapping table, a forwarding table lookup unit configured to look up a forwarding table based on the destination MAC address to determine a cached network interface card to send the data packet, a neighbor lookup unit configured to look up a neighbor information table based on the destination MAC address to determine a cached network interface card to send the data packet, and a data packet transmitter configured to send the data packet to the network interface card determined by the forwarding table lookup unit or the neighbor lookup unit, and thereby sending the data packet via the network interface card, wherein when the forwarding table lookup unit does not find a record corresponding to the destination MAC address in the forwarding table, the forwarding table lookup unit sends the destination MAC address to the neighbor lookup unit to look up the neighbor information table, when the neighbor lookup unit finds a record corresponding to the destination MAC address in the neighbor information table, the neighbor lookup unit informs a network interface card in the record to the forwarding table lookup unit as the network interface card to send the data packet, and the forwarding table lookup unit updates the forwarding table to add a new record,
wherein every three servers form a group, a first server in a server group is connected to a downlink port of a first switch and a downlink port of a second switch via its two network interface cards, respectively; a second server in the server group is connected to a downlink port of the first switch and a downlink port of a third switch via its two network interface cards, respectively; and a third server in the server group is connected to a downlink port of the second switch and a downlink port of the third switch via its two network interface cards, respectively.

2. The server interconnection system according to claim 1, wherein the downlink ports are 1G Ethernet ports, and the uplink port is a 10G Ethernet port.

3. The server interconnection system according to claim 1, wherein the three switches and the m servers are deployed in one single rack.

4. An improved server interconnection system comprising:
three server interconnection systems according to claim 1, each of said m servers having at least four network interface cards in which two network interface cards are still connected to downlink ports of different switches in its server interconnection system, and the other two network interface cards are respectively connected to corresponding newly-added network interface cards of corresponding servers in the other two server interconnection systems,
wherein a first server in a server group of a first server interconnection system is connected to a corresponding newly-added network interface card of a first server in a server group of a second server interconnection system and a corresponding newly-added network interface card of a first server in a server group of a third server interconnection system via its two newly-added network interface cards, respectively; a second server in the server group of the first server interconnection system is connected to a corresponding newly-added network interface card of a second server in the server group of the second server interconnection system and a corresponding newly-added network interface card of a second server in the server group of the third server interconnection system via its two newly-added network interface cards, respectively; a third server in the server group of the first server interconnection system is connected to a corresponding newly-added network interface card of a third server in the server group of the second server interconnection system and a corresponding newly-added network interface card of a third server in the server group of the third server interconnection system via its two newly-added network interface cards, respectively;
the first server in the server group of the second server interconnection system is connected to a corresponding newly-added network interface card of the first server in the server group of the first server interconnection system and a corresponding newly-added network interface card of the first server in the server group of the third server interconnection system via its two newly-added network interface cards, respectively; the second server in the server group of the second server interconnection system is connected to a corresponding newly-added network interface card of the second server in the server group of the first server interconnection system and a corresponding newly-added network interface card of the second server in the server group of the third server interconnection system via its two newly-added network interface cards, respectively; the third server in the server group of the second server interconnection system is connected to a corresponding newly-added network interface card of the third server in the server group of the first server interconnection system and a corresponding newly-added network interface card of the third server in the server group of the third server interconnection system via its two newly-added network interface cards, respectively;
the first server in the server group of the third server interconnection system is connected to a corresponding newly-added network interface card of the first server in the server group of the first server interconnection system and a corresponding newly-added network interface card of the first server in the server group of the second server interconnection system via its two newly-added network interface cards, respectively; the second server in the server group of the third server interconnection system is connected to a corresponding newly-added network interface card of the second server in the server group of the first server interconnection system and a corresponding newly-added network interface card of the third server in the server group of the third server interconnection system via its two newly-added network interface cards, respectively; the third server in the server group of the third server interconnection system is connected to a corresponding newly-added network interface card of the third server in the server group of the first server interconnection system and a corresponding newly-added network interface card of the third server in the server group of the second server interconnection system via its two newly-added network interface cards, respectively.

5. The server interconnection system according to claim 1, wherein when the forwarding table lookup unit finds a record corresponding to the destination MAC address in the forwarding table, the forwarding table lookup unit determines a network interface card in the record as the network interface card to send the data packet.

6. The server interconnection system according to claim 1, further comprising:
  a network interface card selector configured to select a network interface card to send the data packet based on an eXclusive OR (XOR) operation,
  wherein the data packet transmitter is further configured to send the data packet to the network interface card selected by the network interface card selector, and thereby sending the data packet via the network interface card,
  wherein
  when the neighbor lookup unit does not find a record corresponding to the destination MAC address in the neighbor information table, the network interface card selector selects a network interface card to send the data packet based on an eXclusive OR operation,
  the network interface card selector determines a network interface card by the following eXclusive OR operation: network interface card index=(source MAC address XOR destination MAC address) modulo (the number of the network interface cards).

7. The server interconnection system according to claim 1, wherein
  when the neighbor lookup unit does not find a record corresponding to the destination MAC address in the neighbor information table, the neighbor lookup unit sends a neighbor query message including the destination MAC address to a direct neighbor via the data packet transmitter,
  when any one of direct neighbors returns a neighbor confirmation message, the neighbor lookup unit informs a network interface card of the one direct neighbor record to the forwarding table lookup unit as the network interface card to send the data packet, and the forwarding table lookup unit updates the forwarding table to add a new record.

8. A server interconnection system, comprising:
  three switches each having n downlink ports and at least one uplink port, wherein n is an integer equal to or larger than 2; and
  m servers each having at least two network interface cards respectively connected to downlink ports of different switches, wherein m=3p/2, p is an even number equal to or larger than 2 but equal to or less than n, wherein each of said m servers is a server comprising a data packet receiver configured to receive a data packet from a network interface card, a data packet classifier configured to determine whether a destination Media Access Control MAC address of the data packet is a MAC address of the server or not, and send the destination MAC address to a neighbor lookup unit when the destination MAC address is not the MAC address of the server, a neighbor lookup unit configured to look up a neighbor information table based on the destination MAC address to determine a cached network interface card to send the data packet, and a data packet transmitter configured to send the data packet to the network interface card determined by the neighbor lookup unit, and thereby sending the data packet via the network interface card, wherein every three servers form a group, a first server in a server group is connected to a downlink port of a first switch and a downlink port of a second switch via its two network interface cards, respectively; a second server in the server group is connected to a downlink port of the first switch and a downlink port of a third switch via its two network interface cards, respectively; and a third server in the server group is connected to a downlink port of the second switch and a downlink port of the third switch via its two network interface cards, respectively.

9. The server interconnection system according to claim 8, wherein
  when the neighbor lookup unit does not find a record corresponding to the destination MAC address in the neighbor information table, the data packet classifier drops the data packet.

10. The server according interconnection system to claim 8, wherein
  when the destination MAC address is the MAC address of the server, the data packet classifier uploads the data packet to a network protocol stack.

11. A data forwarding method comprising:
  providing a server interconnection system including three switches each having n downlink ports and at least one uplink port, wherein n is an integer equal to or larger than 2, and m servers each having at least two network interface cards respectively connected to downlink ports of different switches, wherein m=3p/2, p is an even number equal to or larger than 2 but equal to or less than n, and servers connected by the downlink ports are neighboring servers;
  obtaining a data packet from a network protocol stack, and determining a destination Media Access Control (MAC) address of the data packet with an Address Resolution Protocol (ARP) mapping table, wherein if the destination MAC address calls for transmitting the data packet between neighboring servers, the data packet is transmitted via the downlink ports of the switch connecting the neighboring servers;
  looking up a forwarding table based on the destination MAC address to determine a cached network interface card to send the data packet;
  if a record corresponding to the destination MAC address is not found in the forwarding table, looking up a neighbor information table based on the destination MAC address to determine a cached network interface card to send the data packet; and if a record corresponding to the destination MAC address is found in the neighbor information table, sending the data packet via the determined network interface card.

12. The data forwarding method according to claim 11, further comprising:

if a record corresponding to the destination MAC address is found in the forwarding table, sending the data packet via the determined network interface card.

13. The data forwarding method according to claim 11, further comprising:

if a record corresponding to the destination MAC address is not found in the neighbor information table, selecting a network interface card to send the data packet based on an eXclusive OR operation, and sending the data packet via the selected network interface card.

14. The data forwarding method according claim 11, further comprising:

if a record corresponding to the destination MAC address is not found in the neighbor information table, sending a neighbor query message including the destination MAC address to a direct neighbor or neighbors, if any one of the direct neighbors returns a neighbor confirmation message, sending the data packet to the direct neighbor having sent the neighbor confirmation message;

if no neighbor confirmation message is received, selecting a network interface card to send the data packet based on an exclusive OR operation, and sending the data packet via the selected network interface card.

15. The data forwarding method according claim 13, wherein a network interface card is determined by the following eXclusive OR (XOR) operation:

network interface card index=(source MAC address XOR destination MAC address) modulo (the number of the network interface cards).

16. A data forwarding method comprising:

providing a server interconnection system including three switches each having n downlink ports and at least one uplink port, wherein n is an integer equal to or larger than 2, and m servers each having at least two network interface cards respectively connected to downlink ports of different switches, wherein m=3p/2, p is an even number equal to or larger than 2 but equal to or less than n, and servers connected by the downlink ports are neighboring servers;

receiving a data packet from a network interface card, and determining whether a destination Media Access Control (MAC) address of the data packet is a MAC address of the server or not, wherein if the destination MAC address calls for transmitting the data packet between neighboring servers, the data packet is transmitted via the downlink ports of the switch connecting the neighboring servers, if the destination MAC address is not the MAC address of the server, looking up a neighbor information table based on the destination MAC address to determine a cached network interface card to send the data packet; and if a record corresponding to the destination MAC address is found in the neighbor information table, sending the data packet via the determined network interface card.

17. The data forwarding method according to claim 16, further comprising:

if a record corresponding to the destination MAC address is not found in the neighbor information table, dropping the data packet.

18. The data forwarding method according to claim 16, further comprising:

if the destination MAC address is the MAC address of the server, uploading the data packet to a network protocol stack.

* * * * *